Aug. 3, 1943.   D. C. COX   2,325,665
SORTING MACHINE
Filed Jan. 13, 1941   5 Sheets-Sheet 3

INVENTOR
David C. Cox
BY Earl D. Chappell
ATTORNEYS.

Aug. 3, 1943.  D. C. COX  2,325,665
SORTING MACHINE
Filed Jan. 13, 1941  5 Sheets-Sheet 4

INVENTOR
David C. Cox
BY Earl D. Chappell
ATTORNEYS.

Patented Aug. 3, 1943

2,325,665

UNITED STATES PATENT OFFICE 2,325,665

SORTING MACHINE

David C. Cox, Grand Rapids, Mich., assignor to Electric Sorting Machine Company, Grand Rapids, Mich., a corporation of Michigan Application January 13, 1941, Serial No. 374,224

32 Claims. (Cl. 209—73)

This invention relates to improvements in sorting machines.

The main objects of this invention are:

First, to provide a sorting machine for the sorting of homogeneous objects such as beans, peas, peanuts, coffee beans and other articles, which is highly efficient and of very large capacity.

Second, to provide a sorting machine having a rotatable suction drum type of conveyor with an improved feed means for supplying the articles to be sorted thereto in a manner permitting higher speed operation of the conveyor.

Third, to provide a feed means for supplying articles to be sorted to a suction type of conveyor whereby the articles are traveling at a speed approximating the speed of the conveyor when they are picked up by the conveyor.

Fourth, to provide in a sorting machine of this type means for presenting the articles to be sorted to the conveyor so that they are effectively picked up thereby and the conveyor effectively loaded to full capacity.

Fifth, to provide in a sorting machine a rotary feed for articles to be picked up by a conveyor which is of generally parabolic section and is effective to progressively advance articles deposited thereon in a smooth, steady and controlled manner toward the periphery thereof whereby to dispose the same in a uniform annular ring to be picked up by the conveyor.

Sixth, to provide a paraboloid type rotary feed of the character described which effects a proper distribution of the articles regardless of the size, weight, or outline thereof.

Seventh, to provide a sorting machine having these advantages which is simple and durable in its parts and not likely to become clogged or inoperative in use.

Eighth, to provide article feeding means for a sorting or like machine having means for operating on articles and wherein the articles picked up from a distributor by mechanical means are caused to flow past said operating means in a steady stream separated from said mechanical means.

Further objects and advantages pertaining to details and economies of construction and operation will appear from the description to follow. The invention is defined in the claims.

A structure embodying the features of the invention is illustrated in the accompanying drawings, wherein.

In the embodiment of the invention illustrated in the accompanying drawings, the structure is especially designed for the sorting of homogeneous objects, such as Navy beans, peas, peanuts, coffee beans and the like, according to color or light reflecting characteristics. Machines of this type are illustrated in the Hanson Patent 2,054,320, issued September 15, 1936, and in the patents to David C. Cox 2,131,095 and 2,131,096, issued September 27, 1938, and 2,152,758, issued April 4, 1939.

One of the main objects of the present invention is to increase the speed and capacity of the machine without destroying its efficiency and this is accomplished primarily by providing an improved feed means in association with a rotatable suction conveyor whereby the articles which are individually picked up by the suction conveyor to be carried to the inspection apparatus are effectively fed to the suction conveyor and are in motion at a speed approximating the speed of the moving conveyor at the time they are picked up, thereby effecting capacity loading at high conveyor speeds.

Further features of importance are the means for supplying the articles to be sorted to the feed member so that the same is kept fully charged at the pickup point, at the same time not flooding or overloading it.

Various other features of importance will be made clear as the description proceeds.

In the embodiment illustrated in the accompanying drawings, the reference numeral 1 indicates the supporting frame for various parts of the apparatus. Since the specific details of the sorting mechanism, that is, the selecting mechanism, on the whole form no part of this present invention, I merely designate certain thereof in a general manner.

As stated, the patents referred to illustrate various details of the sorting mechanism of this type, such as the viewing, ejecting mechanism, and other features and refinements. As viewed in Fig. 1, the sorting machine comprises an illuminating and viewing mechanism, designated generally by the numeral 3, adapted to illuminate and photoelectrically inspect articles translated to the housing by the rotary suction conveyor 4. Certain details of structure of both mechanism 3 and the conveyor 4, as particularly related to the present invention, will be referred to in the description to follow. Driven in synchronism with the conveyor 4 is a suitable commutator 5 for timing the electrical energization of certain photoelectric classifying instrumentalities. The conveyor wheel 4 and other driven elements associated therewith are driven from the motor 6 mounted on the frame 1 through a suitable drive as the belt indicated at 7.

Figure 3:
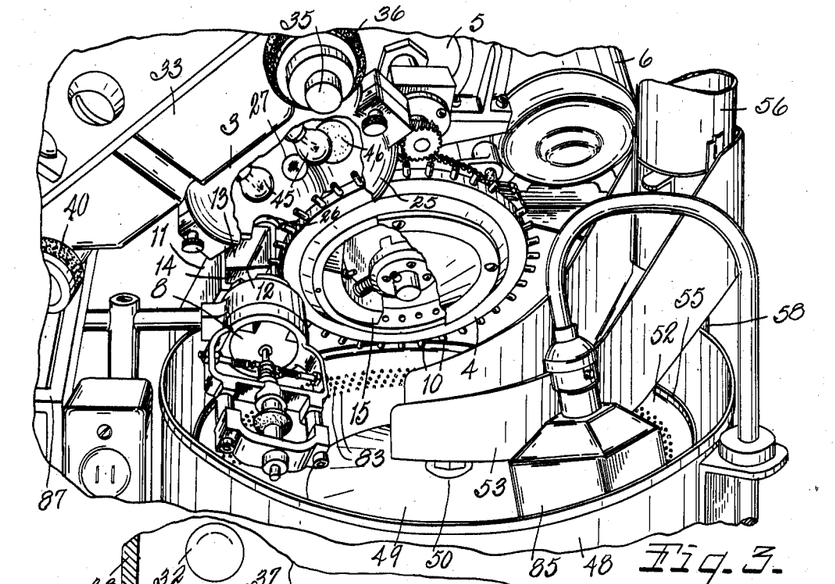
Fig. 3 is an enlarged fragmentary perspective view looking downwardly on the article feeding, conveying and sorting instrumentalities, illustrating the relation of the suction conveyor, the coacting feed member and portions of the feed member supply means, portions of certain mechanisms being partially broken away.
Figure 5:
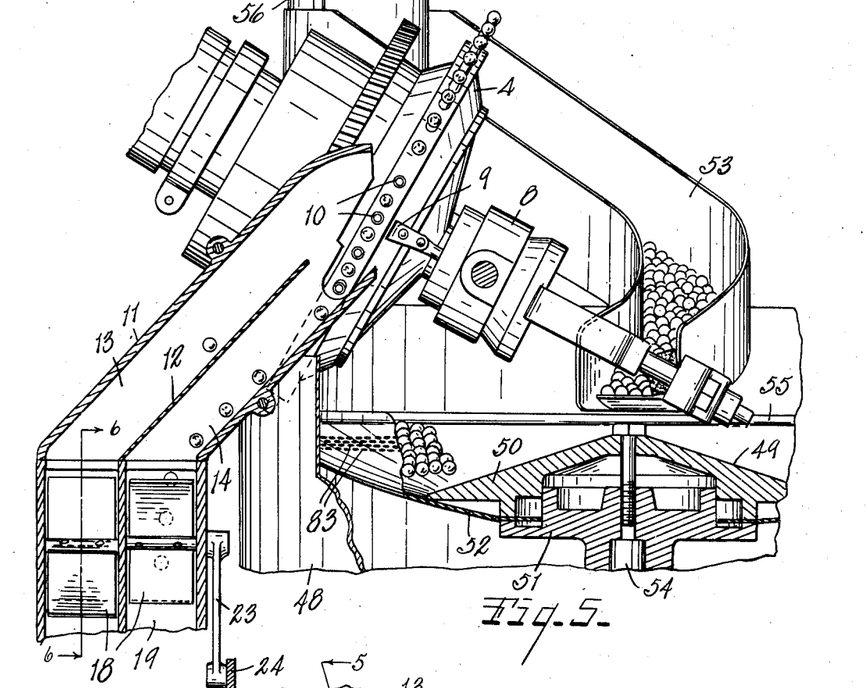
Fig. 5 is an enlarged fragmentary view in elevation, illustrating certain details of the article supply means, the feed means, the conveyor and discharge means of the machine, the discharge means being broken away and in section on line 5—5 of Fig. 6 to show details of the discharge means.
Figure 6:
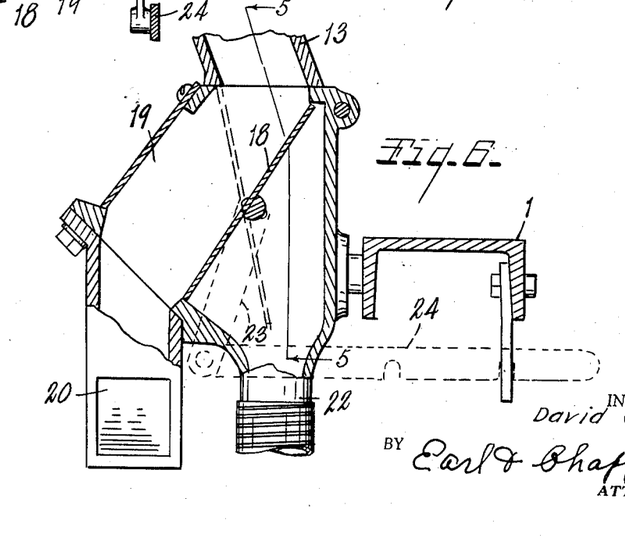
Fig. 6 is a fragmentary view in section on line 6—6 of Fig. 5, further illustrating details of the aforesaid discharge means.

An ejector mechanism controlled by the aforesaid photoelectric instrumentalities is illustrated as to certain features in Figs. 3 and 5 and is generally designated by the numeral 8. This is, in the embodiment illustrated, a solenoid actuated tappet or hammer 9 adapted, when the solenoid is electrically energized by the instrumentalities referred to, to be projected across the path of the objects sorted to strike and eject an article into a receiving or discharge device 11 (see Figs. 5 and 6) which is associated with the frame in receiving relation to the conveyor. The articles to be sorted are conveyed to the sorting point in a spaced series by the suction orifices 10 of the conveyor 4.

Figure 2:
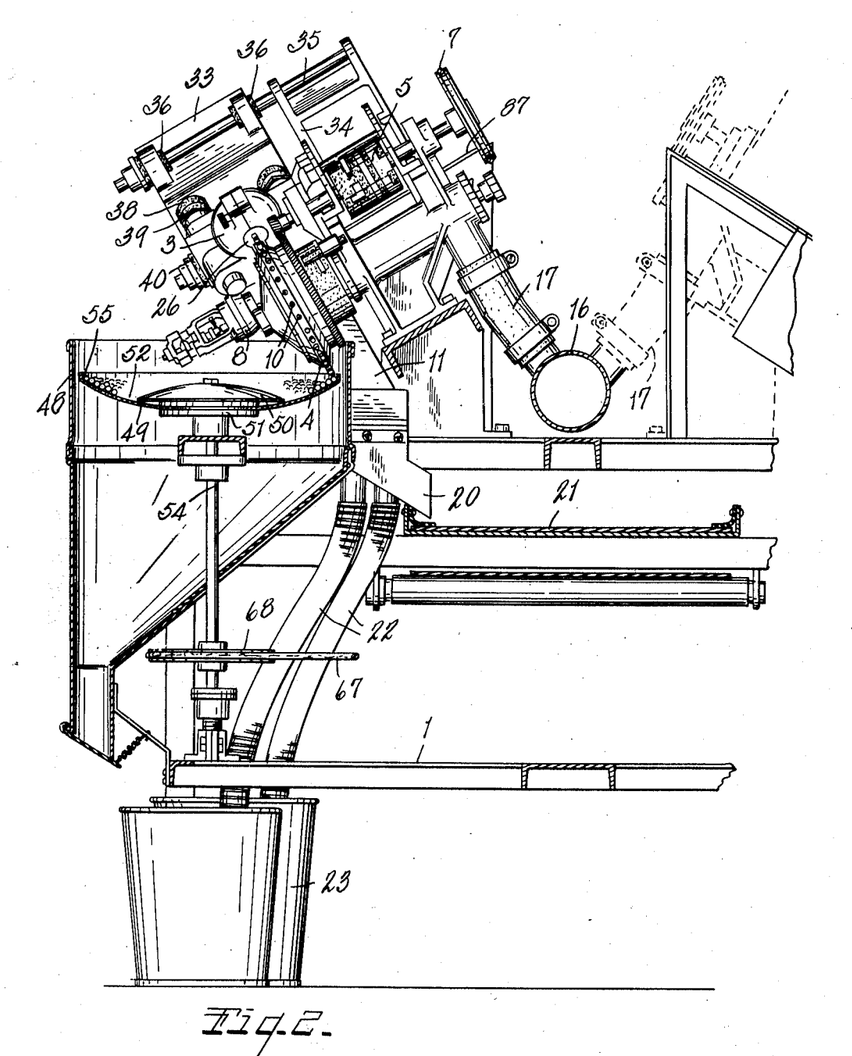
Fig. 2 is a fragmentary side elevational view, partially in vertical section, further illustrating features of the invention and indicating in dotted lines how a plurality of machines may be arranged or assembled to provide a plant of a desired output capacity.

Receiving device 11 is in the form of a hollow downwardly inclined tube or chute divided by a partition 12 into two passages 13, 14, the latter of which is disposed in a plane intersecting the plane of the path of articles on conveyor 4 so as to receive the articles when they are dropped by gravity from the article seats. A substantial vacuum holding the articles on the seats exists interiorly of the conveyor, which vacuum is cut off at a predetermined point in the article travel by a shoe 15 disposed interiorly of the conveyor (see Fig. 3). Shoe 15 provides an area in the conveyor which is at atmospheric pressure. The rest of the interior of the conveyor is in communication with a vacuum header 16 shown in Fig. 2 by means of a branch pipe 17. It is contemplated that a single vacuum header 16 will be provided for a number of machines assembled in a gang, as illustrated by dotted lines in Fig. 2, this header extending lengthwise of the gang of machines and between individual machines arranged on opposite sides thereof. In this manner, a system of any desired output may be provided.

As described in said Cox Patent 2,152,758, the vacuum effective on the article conveying seats is cut off at a predetermined point in the rotation of the conveyor, so that articles not ejected by tappet 9 and discharged thereby in a manner to be described will drop by gravity into the discharge passage 14. In the present machine, provision is made that the vacuum is cut off by shoe 15 at a point substantially in advance of tappet 9 so that when the articles reach the path of the tappet they are falling in a steady stream, free from and out of contact with the suction seats or orifices 10 on which they were previously transported. In this manner assurance is had that the articles will be completely freed from the conveyor in the ejecting operation. It has been found that certain classes of articles have a tendency to resist dislodgment by the ejector from a suction seat such as is shown. Thus, a lightweight, irregular or spongy article in some instances has a tendency to be merely spun around on the suction seat when struck by the ejector without leaving the same or, if, as sometimes happens, it is but partially removed from the seat, to return thereto under the influence of the suction effective therein, in the event suction is present. It will be apparent that an ejector striking a soft, spongy article is incapable of projecting the same with the same force of rebound as when it strikes a relatively firm, solid article. By cutting off the suction in advance of the ejection point and permitting the articles to leave the seats under the influence of gravity and centrifugal force, this tendency to resist displacement and the factor of inefficiency in the sorting operation which it introduces are eliminated.

Releasing the articles from the suction seats prior to striking the same with the ejector is likewise desirable when certain irregular and ofttimes pointed articles such as kernels of corn are sorted. These sometimes tend to be drawn onto the suction seats with the points thereof extending downwardly into the interior of the seat. When struck by the ejector in such position, they are in many cases sheared off, which not only damages the kernel, but also is apt to cause clogging of the suction channel or at least an undesirable drawing of particles into the interior of the suction conveyor. In freeing the articles from the seats prior to ejecting the same, I eliminate this difficulty. It will be appreciated that the operation of the tappet in discharging the articles is extremely rapid. In a practical embodiment, the tappet makes sixty-five strokes per second when continuously energized.

Tappet 9 strikes an article to be ejected with sufficient force to deflect the same from its normal path through the air into the upper passageway or chute 13. It will of course be evident that arrangements can be made whereby defective articles, or articles of one color or shade, may be deflected into passage 13 and acceptable articles, or those of another color or shade, allowed to fall into passage 14, or vice versa. In any event, each of the passages 13, 14 is preferably provided with a butterfly type valve 18 pivoted medially in a chamber 19 with which the said passages communicate. This valve controls the discharge of articles entering that passage, either to a discharge chute 20 opening onto and discharging to a belt conveyor 21 or to a conduit 22 leading to a bucket or other receiver 23. This arrangement is desirable for initially setting the machine, in that it enables an initial run of articles to be made into the receiver 23 to ascertain if proper selection is being made. When the proper setting is made, the valves 18 are appropriately adjusted so that acceptable articles are discharged through chute 20 on the traveling belt 21 and defectives led away to the receiver, or vice versa. Belt 21 extends longitudinally between the various machines of a given system so as to receive the output of all thereof.

The positioning of valves 18 is controlled manually employing a lever 23 fixed to the valve pivot and a link 24 pivoted on this lever adjustably engageable with the machine frame.

Figure 4:
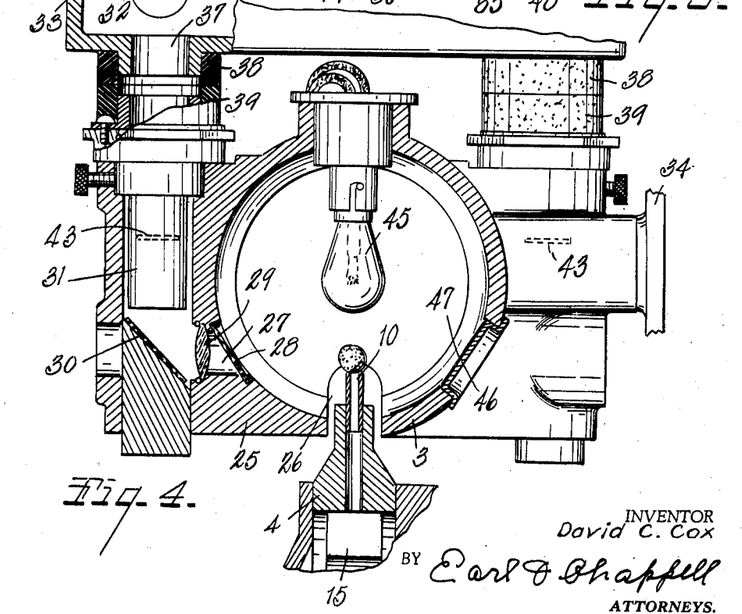
Fig. 4 is a fragmentary view partially in section illustrating the relation of the photoelectric article viewing apparatus in relation to the conveyor, and certain features of the viewing apparatus.

The article illuminating and photoelectric viewing mechanism 3 referred to above is illustrated in some detail in Fig. 4 and, as there illustrated, comprises a housing 25 having openings 26 thereon through which articles are translated on their respective conveyor seats or suction orifices 10. This housing may be of the type illustrated in the patent to Cox 2,190,935 of February 20, 1940, however in the present structure a modified structure is used. As illustrated, housing 25 is elongated in the direction of rotation of the wheel, as illustrated in Fig. 3, and the interior thereof is characterized by a double-spherical formation. In the present device, I contemplate viewing both sides of each article as it passes through the viewing housing and to this end I provide the latter with a pair of side viewing apertures 27, one for each spherical portion of the housing, these apertures being located on the side of the housing and in longitudinally spaced relation. Each of these apertures is covered by a glass plate 28 to prevent the entrance of dust or the like from the housing interior. Light reflected from the article through this plate is focused by a double convex lens 29 arranged in aperture 27 and impinges a mirror 30 disposed at 45°, by which it is directed through a viewing channel 31 having therein a suitable filter 43 onto the photoelectric tube 32 disposed in the photoelectric and amplifying housing 33. The viewing housing 25 is fixedly supported on a bracket 34 secured to the machine frame, while the photoelectric and viewing housing 33 is pivoted on a bracket secured to the frame, whereby to enable the said housing 32 to be swung upwardly and away from its normal operative relation to the viewing housing 25. It is desirable to take precaution that the housing 33 and photoelectric and amplifying instrumentalities housed therein are shielded as much as possible from the vibration of the machine. Thus I preferably employ sponge rubber sleeves or bushings 36 to effect the pivotal connection of the housing on rod 35; likewise housing 33 at the aperture 37 therein through which it communicates with the viewing tube 31 is provided with an annular rubber insulating cushion 38 engageable with a similar cushion 39 arranged on the viewing tube. This rubber insulating cushion is preferably of sponge rubber. The rubber cushion 40 shown in Figs. 1 and 2 also coacts with further elements (not shown) for clamping housing 33 in its operative position with a minimum of vibration.

A source of illumination or lamp 45 is provided for each photoelectric viewing channel, being located in the center of the individual spherical portions of the double-spherical housing. Disposed directly opposite from each viewing aperture 27, is a removable reference background in the form of a disk 46 coated on its inner surface with a layer of paint or pigment 47 to provide the proper color reference background for the particular articles being sorted. A plurality of such special background members 46 is furnished for each machine, the same being painted different colors or shades and being readily insertable and removable as the sorting operation requires. It will be understood that this background lies directly behind the article at the inspection point in the line of view of the photoelectric tube.

From the foregoing description, it will be apparent to those skilled in the art that the two photoelectric devices associated with the machine take successive views of opposite sides of the article as it is transported by wheel 4 through the respective spherical halves of the viewing housing 25. This of course results in the generation of successive electrical impulses in the event the article is a cull or has spots on both sides differing in light reflectivity a predetermined amount from a standard. The judgments of the photoelectric tubes in such case are synchronized in a suitable manner and applied to the grid of a grid controlled gaseous discharge tube circuit for energization of the ejector mechanism 8. This electrical hookup forms no part of the present invention, hence is not described in greater detail.

The reference numeral 48 in Figs. 1, 2, 3, 5, and 7 designates a sheet metal casing wherein is rotatably mounted a concave bowl-like feed member 49. This feed member consists of a pair of castings 50 and 51, of which the uppermost 50 is shaped like a flattened cone (see Fig. 5), and the concave body 52 which in this embodiment is formed of sheet metal, as aluminum, and clamped between the parts 50, 51. Articles deposited adjacent the periphery of the member 50 from the feed or supply chute 53 (to be hereinafter described) slide smoothly onto the concave body portion of the feed member and are thence carried outwardly toward the periphery thereof under the influence of centrifugal force of rotation about shaft 54. The feed member 52 terminates in a peripheral, vertically disposed fence or flange 55.

It will be noted that the conveyor 4 is disposed at an angle to the horizontal and so that its suction tips or nipples rotate in a plane approximately normal to the surface of the feed member at the base of its flange 55. The speed of rotation of the feed member and the curvature of the concave body portion 52 thereof are such that when articles have slidingly advanced radially as far as the fence or flange, the latter serves to prevent any chance or likelihood of tumbling or spilling of the articles outwardly. Objects that may possibly be thrown over the flange or which are insecurely engaged by a suction orifice and thrown over the flange are collected in the casing 48 and may be removed from the bottom thereof.

In order to secure a smooth, steady outward travel of the articles to the desired annular position adjacent the fence 55, the bowl member body 52 is formed in the outline of a modified paraboloid. If the bowl were made in accordance with the paraboloid equation $y=x^2$, and run at a predetermined critical speed, there would be no inclination to keep the articles running in a radial direction, for the inclination of the parabola would exactly counteract the effect of centrifugal force and maintain the articles in a stable or balanced dynamic state. The use of an excessive speed is one way of counteracting this and causing the articles to move outwardly, however if this is attempted, it is found that the surplus force is not distributed evenly, being inadequate at the center and excessive at the circumference, so that the desired uniform outward travel does not occur.

Accordingly, it is contemplated that the curve for the face of the feed member 52 shall be that of a paraboloid, modified so that the slope thereof at any given point is a predetermined number of degrees less than the true parabolic slope. In other words, whereas a true paraboloid rotated at critical speed behaves very much like a stationary flat horizontal surface so far as articles deposited thereon are concerned, save that the gravitational effect is somewhat increased, a paraboloid modified as above acts like a stationary flat surface with a slope of a predetermined number of degrees.

It can be shown by calculus that for a true paraboloid disposed with its axis vertically, $y$, the height at any point,=

$$\frac{\omega^2 r^2}{2g}+C$$

where $\omega$=velocity in radians per second,
$r$=radius at any point in centimeters,
$g$=acceleration due to gravity=981 cm. per sec.$^2$,
$C$=a constant for locating the curve with reference to one Cartesian coordinate or reference plane.

The equation for a modified paraboloid is, $$y=\frac{\omega^2 r^2}{2g}-Dr+C$$

for plus values of $r$ only, where D equals the tangent of the modifying angle. Obviously, in both of these equations the constant, C, may be disregarded so far as the feed member design is concerned.

Values for $y$, the height of the bowl at any desired point, are readily arrived at knowing the intended speed of operation of the bowl, the radius at its periphery and the desired modifying angle. In a practical embodiment, this angle is 2½°. So modified, the parabolic curve causes the article to travel radially outwardly with a force which is 4½% of the weight of the article. This is just sufficient to maintain the articles in a peripherally traveling ring without unduly tumbling the same outwardly so as to cause them to fall over the fence 55. For a 5° altered surface, the force amounts to 9% of the weight of the articles, which means that if, say, seven articles are arranged one behind the other in a radial direction, the total force exerted on the radially outermost article is equal to seven times 9%, or 63% of the weight of the article, which is in many cases sufficient to force the same over the fence. A 2½° altered slope is not subject to this objection.

Other formulae for a generally parabolic bowl section may be derived which are useful in certain circumstances, as for example when the slope of the curve becomes large.

Designed in the foregoing manner, the paraboloid bowl type of feed member is effective in distributing articles regardless of the size, weight, or outline thereof. In order to insure the distributing action, the feed member is preferably rotated at an uneven or slightly pulsating speed, though the average speed for each revolution is identical. This uneven rotation of the feed member does not, however, effect an appreciably uneven rotary movement of the articles. On the contrary, the latter travel at an approximately constant rotary velocity; however the feed member, due to the unevenness in its rotation, is caused to periodically advance beneath the articles thereon so as to eliminate any tendency for their reaching a static condition on the feed member or "freezing" thereto. This overcomes whatever frictional effect may exist due to differing frictional coefficients of the articles and affords the centrifugal force of the feed member an opportunity to act effectively on the articles to distribute them radially. Details of construction whereby such a non-uniform rotation of the feed member is effected will be hereinafter described.

It should not be assumed from the foregoing that the articles are rapidly thrown off radially following deposition at the center of the feed member. On the contrary, they have a steady, uniform, and controlled radial movement and no flying, tumbling, or the like takes place. In an operative embodiment, wherein the feed member runs at approximately 60 R. P. M., it takes about thirteen revolutions for an article deposited thereon to reach the outer periphery, however the articles are continuously supplied to the feed member, so that at all times there are several annular layers adjacent the periphery in position to be picked up by the conveyor wheel 4. These several annular layers or the articles constituting layers are in contacting relation to each other as is clearly shown in Figs. 5 and 7.

Another factor for securing the best results and greatest efficiency is that the speed of the feed member, or rather the objects carried thereby when in supporting contact with the flange or fence of the feed member, approximates that of the speed at which the suction nipples or orifices are traveling, being preferably slightly less than that of the conveyor, but may be slightly greater with satisfactory results.

Figure 1:
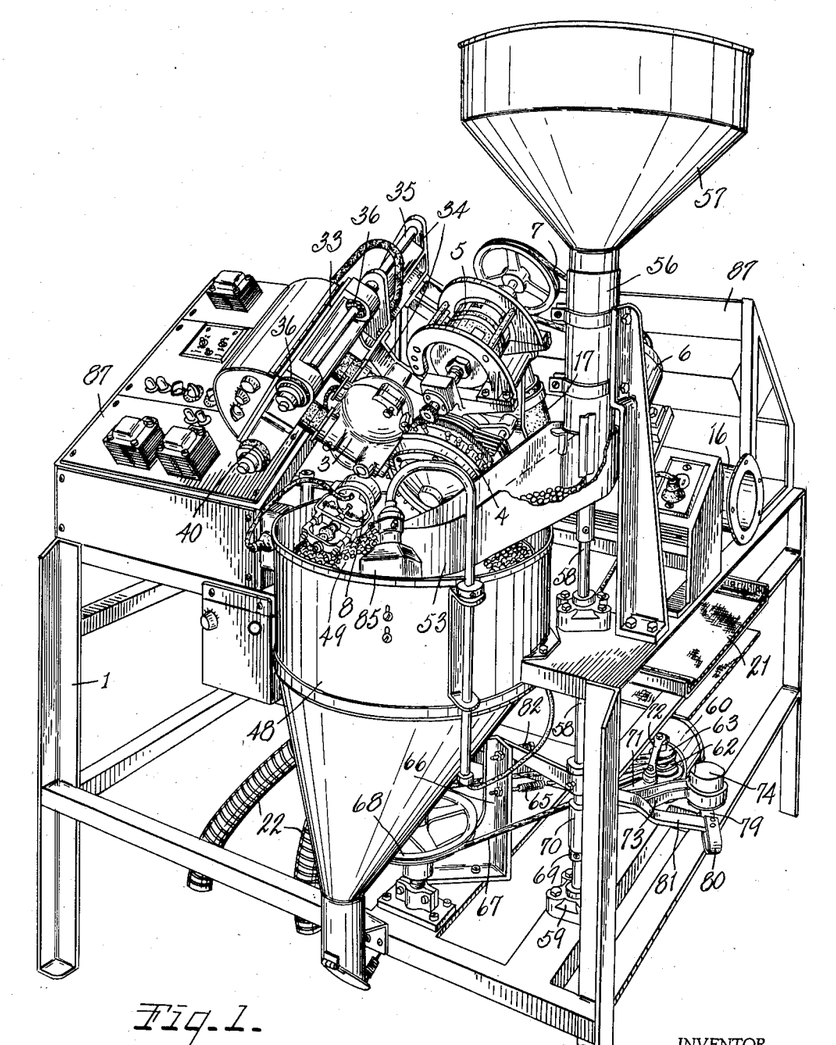
Fig. 1 is a perspective view of a machine embodying the features of the invention with certain parts broken away and certain parts conventionally shown.

The articles to be sorted are supplied to the feed member from the chute 53, which is in turn supplied through the vertical conduit 56 from a hopper 57 ((see Fig. 1). This hopper may, if desired, be connected to a suitable source of supply, such as a bin on a floor above the machine.

The chute 53 is mounted for oscillation or agitation on a shaft 58 journaled in a suitable bearing 59 on the frame. It will be noted that the chute is curved and its mouth is directed substantially radially of the feed member (see Fig. 5).

Figures 7, 8, 9:
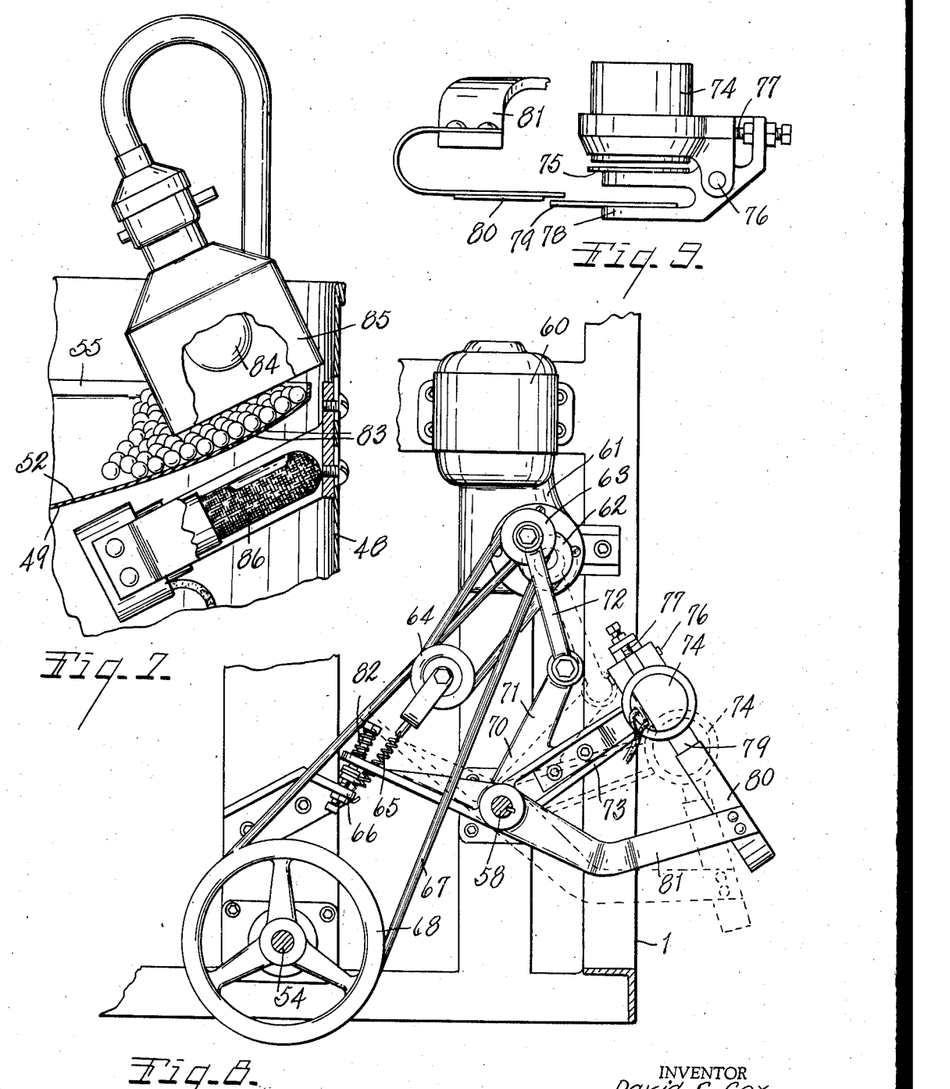
Fig. 7 is a fragmentary view partially broken away and in vertical section illustrating details of the photoelectric supply assuring device associated with the article feed member.
Fig. 8 is a fragmentary top plan view illustrating the feed member driving and related structure.
Fig. 9 is a fragmentary view in elevation illustrating a detail of the hopper or supply chute agitating device which is associated with the feed member drive.

As illustrated in Figs. 1 and 8, the shafts 54 and 58 are vertically disposed and in parallel relation to each other and are actuated, the one to drive the feed member 52, and the other to oscillate or agitate the chute under certain conditions, as will now be described, reference being had to Figs. 1, 8, and 9.

A motor 60 is mounted on the machine frame and is provided with a suitable driving connection or coupling 61 to a pair of eccentrically arranged pulleys 62, 63 rotatable on vertical axes. These pulleys are in turn arranged eccentrically on the vertical shaft (not shown) of coupling 61, so that as motor 60 is driven the axes of the eccentric pulleys describe paths about said coupling output shaft. A belt tensioning idler pulley 64 is connected by the coil tension spring 65 to an upstanding bracket member 66 on the machine frame. A flexible drive belt 67 is trained successively around the feed member drive pulley 68, eccentric pulley 63, the belt tensioning pulley 64, eccentric pulley 62, and back to the feed member drive pulley 68, so that by reason of the eccentricity of pulleys 61, 62 relative to the motor driven shaft, the feed member drive pulley 68 is driven at a non-uniform or pulsating speed. This is effective to overcome article friction, as stated above, and serves to keep the articles moving steadily toward the feed member periphery. The linear rotating speed of the articles themselves is, on the whole, constant. The two eccentric pulleys automatically compensate for the varying lengths of the belt reaches as the eccentrics operate and the tensioner 64 merely serves to maintain an adequately tight belt.

The supply chute 53 is so shaped and its pitch is such that, without agitation, oscillation or jarring, the articles sorted do not flow freely therefrom, though some slight creep exists, but upon agitation or oscillation they are discharged upon the feed member in the desired quantity. The feed chute agitator shaft 58 has a thrust collar or thrust bearing member 69 (see Figs. 1 and 8) secured thereto, which rotatably supports the rocker member 70 on the shaft 58. This rocker member is provided with an arm 71 which is pivotally connected to the connecting rod or pitman link 72, this connecting rod being pivotally mounted on the eccentric pulley 63.

As the eccentric pulley 63 describes its circular or orbital path, the rocker 70 is oscillatably actuated. Rocker 70 carries a laterally projecting arm 73 which serves as a support for an electromagnet 74, the core or armature 75 of which is, in this embodiment, in the form of a disk pivotally mounted at 76 on the electromagnet mounting (see Fig. 9). A set screw 77 limits the downward movement of the armature. The armature is provided with an arm 78 terminating in a blade-like tappet 79, which, when the armature is in actuated position, engages a laterally extending blade-like dog 80 fixed to the end of a rocker arm 81 which is keyed to the chute agitator shaft 58, as shown in Fig. 8. Dog 80 is engaged by tappet 79 to oscillate the arm 81 and shaft 58 when the tappet 79 is raised to elevated position by the electromagnet 74. Otherwise, the tappet travels beneath the dog as when the parts are in the position illustrated in Fig. 9, clearing the dog in its oscillation. Return of rocker arm 81 is effected by a spring 82 coacting with the machine frame and an extension on the rocker.

It will be appreciated that the arm 73, the electromagnet 74 carried thereby, and the tappet 79 will be continuously operated through a predetermined degree of oscillation about the shaft 58 as an axis when the machine is in operation, and that when the electromagnet is energized to attract the armature 75, this oscillating motion will be transmitted through the parts described to the chute, which causes the desired discharge of the articles to be sorted therefrom.

The supply controlling means for the rotary feeding mechanism will now be described. Reference being had to Fig. 7, it will be noted that the body member 52 of the feed member 49 is provided with an annular series of holes 83, there being in this embodiment a plurality of concentric rows, the holes of one row being staggered in relation to those of the other. These holes or apertures are disposed at a point or zone intermediate the periphery or outer portion of the feed member and the point at which the chute discharges thereon.

Illuminating means, such as the lamp 84 arranged in the reflector 85, is arranged over the feed member so that the light from this source will pass downwardly through the holes and impinge the photoelectrc cell 86 arranged in the casing 48. The amount of light traversing or passing through the holes and impinging the photoelectric cell depends on whether or not the holes are obscured by the articles or the extent to which they may be obscured thereby. In the event that holes are substantially uncovered and light from the source of illumination impinges the cell 86, it indicates that insufficient articles are on the feed member, hence current is caused to flow in the tube to energize a relay (not shown) or other amplifying means which in turn completes an energizing circuit for the electromagnet 74 through connections which it is not deemed necessary to illustrate. The energization of the electromagnet results in the actuation of the chute shaft 58 in the manner hereinbefore described, and this will be continued until a desired supply is supplied to the feed member, when the electromagnet circuit is interrupted at the photocell. The chute actuation, it will be understood, is in practice more or less regular and recurrent; at the same time overloading of the feed member is prevented.

A control panel 87 for the extensive electrical equipment associated with the apparatus (but not illustrated, inasmuch as the wiring and the like are not part of the present invention) is disposed conveniently to one side of the sorting structure on the frame of the machine.

The apparatus of our invention is highly efficient and has a very large capacity, inasmuch as the machine may be operated at a higher speed than previous machines of this type. Likewise, gangs of the machines may be operated together to further increase the output. While the machines of the patents referred to, for example, are efficient and very practical commercially, the present improvements are designed to embody certain features thereof in a machine of greater capacity in which articles to be sorted are presented to the conveyor so that they are readily picked up thereby at high speed and the conveyor is substantially fully loaded at all times.

As stated, while the feed member is preferably driven at a speed slightly less than that of the conveyor, desirable results can be secured when it is driven at a speed slightly greater than that of the conveyor. The purpose of this is to insure that the feed member will afford ample opportunity for a suction seat or orifice to pick up an article, although the article may not be in exact coincidence with the suction orifice when the latter is presented in a position normal to the surface of the feed member at the pickup point. I find that a speed for the feed member nine-tenths that of the conveyor produces very satisfactory results.

I have illustrated a very practical commercial embodiment of the invention. No attempt has been made to illustrate or describe various modifications and adaptations which may be desired for the sorting of different articles or in different installations as it is believed that this disclosure will enable those skilled in the art to embody or adapt the improvements as may be desired.

Having thus described the invention, what I claim as new and desire to secure by Letters Patent is:

1. In a sorting machine of the class described, the combination of a rotatable suction conveyor provided with an annular series of radially disposed suction nipples having suction orifices at the outer ends thereof, a rotatable horizontally disposed concave feed member having a peripheral upstanding flange, the curvature and radius of the face of said feed member being such that at a predetermined speed of rotation the articles move centrifugally outwardly thereon and are disposed in a single layer adjacent the peripheral flange of the feed member, said conveyor being positioned at an angle to the horizontal and so that the plane in which its suction tips travel is substantially normal to the surface of the feed member adjacent its said flange and so that the suction tips are successively brought to article pickup relation to the peripherally disposed articles on said feed member, means for supplying articles to said feed member comprising an oscillatable chute discharging upon said feed member at a point remote from its periphery, said feed member having an annular series of light transmitting apertures therein substantially at the outside of the point of discharge of said chute and in spaced relation to the said flange, a light sensitive element disposed on one side of said feed member to receive light transmitted through said apertures, an illuminating means disposed on the other side of said feed member in operative relation to said apertures, and means controlled by said light sensitive means for oscillating said chute when the supply of articles on the feed member is insufficient to obstruct transmission of light through said apertures.

2. In a sorting machine of the class described, the combination of a rotatable suction conveyor provided with an annular series of radially disposed suction nipples having suction orifices at the outer ends thereof, a rotatable horizontally disposed concave feed member having a peripheral upstanding flange, the curvature and radius of the face of said feed member being such that at a predetermined speed of rotation the articles move centrifugally outwardly thereon and are positioned in a single layer adjacent the peripheral flange of the feed member, said conveyor being positioned at an angle to the horizontal and so that the plane in which its suction tips travel is substantially normal to the surface of the feed member adjacent its said flange and so that the suction tips are successively brought to article pickup relation to the peripherally disposed articles on said feed member, and means for supplying articles to said feed member.

3. In a sorting machine of the class described, the combination of a rotatable suction conveyor provided with an annular series of radially disposed suction nipples having suction orifices at the outer ends thereof, a rotatable horizontally disposed concave feed member having a peripheral upstanding flange, the curvature and radius of the face of said feed member being such that at a predetermined speed of rotation the articles move centrifugally outwardly thereon and are positioned in a single layer adjacent the peripheral flange of the feed member, said conveyor being positioned at an angle to the horizontal and so that the plane in which its suction tips travel is substantially normal to the surface of the feed member adjacent its said flange and so that the suction tips are successively brought to article pickup relation to the peripherally disposed articles on said feed member, the relative speed of rotation of the conveyor and feed member being such that the articles when picked up by the conveyor are traveling at a speed approximating but somewhat less than the peripheral speed of the conveyor, and means for supplying articles to said feed member.

4. In a sorting machine of the class described, the combination of a rotatable suction conveyor provided with an annular series of suction orifices, a rotatable concave feed member having a peripheral upstanding flange, the curvature and radius of the face of said feed member being such that at a predetermined speed of rotation the articles move centrifugally outwardly thereon and are positioned in a single layer adjacent the peripheral flange of the feed member, said conveyor being positioned so that the suction orifices are successively brought to article pickup relation to the peripherally disposed articles on said feed member, means for supplying articles to said feed member comprising a chute discharging upon said feed member at a point remote from its periphery, said feed member having a light transmitting zone substantially at the outside of the point of discharge of said chute and in spaced relation to the said flange, a light sensitive element disposed on one side of said feed member to receive light transmitted through said zone, an illuminating means disposed on the other side of said feed member in operative relation to said zone, and means controlled by said light sensitive means for discharging articles from said chute when the supply of articles on the feed member is insufficient to obstruct transmission of light through said zone.

5. In a sorting machine of the class described, the combination of a rotatable conveyor provided with an annular series of article seats, a rotatable concave feed member having a peripheral upstanding flange, the curvature and radius of the face of said feed member being such that at a predetermined speed of rotation the articles move centrifugally outwardly thereon and are positioned in a single layer adjacent the peripheral flange of the feed member, said conveyor being positioned so that the article seats are successively brought to article pickup relation to the peripherally disposed articles on said feed member, and means for supplying articles to said feed member.

6. In a sorting machine of the class described, the combination of a rotatable suction conveyor provided with an annular series of suction orifices, a rotatable concave feed member having a peripheral upstanding flange, the curvature and radius of the face of said feed member being such that at a predetermined speed of rotation the articles move centrifugally outwardly thereon and are positioned in a single layer when they reach the peripheral flange of the feed member, said conveyor being positioned so that the suction orifices are successively brought to article pickup relation to the peripherally disposed articles on said feed member, the relative speed of rotation of the conveyor and feed member being such that the articles when picked up by the conveyor are traveling at a speed approximating but varying from the peripheral speed of the conveyor, and means for supplying articles to said feed member.

7. In a sorting machine, the combination of a conveyor provided with a series of suction orifices, a rotatable feed member having a peripheral upstanding flange, said feed member being rotated at such speed that the articles are carried outwardly thereon and disposed in a single substantially continuous layer on the portion of the feed member adjacent its peripheral flange, said conveyor being positioned so that its suction orifices are successively brought to article pick-up relation to the peripherally disposed articles on said feed conveyor, means for supplying articles to said feed member discharging thereon at a point remote from its said periphery, said feed member having an annular series of light transmitting apertures therein at the outside of the point of discharge of said supply means, and means for controlling the delivery of articles by said supply means including a light sensitive element disposed to receive light transmitted through said apertures in said feed member, the articles on said feed member acting to obstruct the transmission of light through said apertures when the supply of articles on the feed member is such as to cover or partially cover the said apertures.

8. In a sorting machine, the combination of a conveyor provided with a series of suction orifices, a rotatable feed member having a peripheral upstanding flange, said feed member being rotated at such speed that the articles are carried outwardly thereon and disposed in a single substantially continuous layer on the portion of the feed member adjacent its peripheral flange, said conveyor being positioned so that its suction orifices are successively brought to article pick-up relation to the peripherally disposed articles on said feed conveyor, the relative speed of the conveyor and feed member being such that when the articles are picked up by the conveyor they are traveling at a speed approximating but varying somewhat from the speed of travel of the conveyor, and means for supplying articles to said feed member discharging thereon at a point remote from its said periphery.

9. In a sorting machine, the combination of a conveyor provided with a series of suction orifices, a rotatable feed member having a peripheral upstanding flange, said feed member being rotated at such speed that the articles are carried outwardly thereon and disposed in a single substantially continuous layer on the portion of the feed member adjacent its peripheral flange, said conveyor being positioned so that its suction orifices are successively brought to article pick-up relation to the peripherally disposed articles on said feed conveyor, and means for supplying articles to said feed member discharging thereon at a point remote from its said periphery.

10. In a sorting machine, the combination of a suction conveyor provided with a series of suction orifices, a rotatable horizontally disposed feed member of generally parabolic section, said feed member being driven at a speed bearing such predetermined relation to its sectional outline that the articles to be sorted are distributed thereon in a single substantially continuous layer at the periphery thereof, said conveyor being so positioned relative to said feed members as to pick up articles from said feed members so distributed thereon, means for supplying articles to said feed member discharging thereon at a point remote from its periphery, and means for controlling the delivery of articles by said supply means controlled by the absence of articles on the surface of said feed conveyor in a predetermined zone.

11. In a sorting machine, a rotatable horizontally disposed feed member of generally parabolic section, means for supplying articles to be sorted to said feed member at a point remote from the periphery thereof, and means for driving said feed member at a speed bearing such predetermined relation to its sectional outline that the articles to be sorted are distributed thereon in a single substantially continuous layer at the periphery thereof.

12. In a sorting machine, the combination of a suction conveyor provided with a series of suction orifices, a rotatable horizontally disposed concave feed member, and means for supplying articles to be sorted to said feed member at a point remote from the periphery thereof, said feed member being driven at such speed that the articles to be sorted are distributed thereon in a single substantially continuous layer at the periphery thereof, said conveyor being so positioned relative to said feed conveyor as to pick up articles from said feed members so distributed thereon, the relative speed of the conveyor and feed member being such that the articles picked up by the conveyor are traveling at a speed approximating but somewhat less than the speed of travel of the conveyor.

13. In a sorting machine, the combination of a conveyor adapted to pick up articles one by one, a rotatable horizontally disposed concave feed member, the curvature and radius of the face of said feed member being such that at a predetermined speed of rotation the centrifugal force exerted on the articles causes the same to move outwardly and be positioned in a single layer at a point spaced from the axis of said feed member, said conveyor being positioned to pick up articles from such layer, and means for rotating said feed member at an irregular speed.

14. In a sorting machine, the combination of a rotary conveyor provided with a series of suction orifices, light sensitive sorting means operatively associated with said conveyor and operative to classify articles thereon, a feed means operatively associated with said conveyor to present articles thereto in a substantially continuous stream traveling tangentially of the point of pickup of the conveyor at a speed approximating the speed of the conveyor but varying slightly therefrom, and means for supplying articles to said feed member controlled to maintain such stream in the pickup zone.

15. In a sorting machine, the combination of a rotary conveyor adapted to pick up articles one by one, light sensitive sorting means operatively associated with said conveyor, a feed means operatively associated with said conveyor to present articles thereto in a substantially continuous stream in a single layer traveling tangentially of the point of pick-up of the conveyor at a speed approximating the speed of the conveyor but varying slightly therefrom, and means for supplying articles to said feed means controlled by the supply of articles on the feed means to maintain such layer in the pick-up zone.

16. In a sorting machine, the combination of a rotary conveyor adapted to pick up articles one by one, light sensitive sorting means operatively associated with said conveyor, a feed means operatively associated with said conveyor to present articles thereto in a substantially continuous stream in a single layer traveling tangentially of the point of pickup, and means for supplying articles to said feed means controlled by the supply of articles on the feed means to maintain such layer in the pick-up zone.

17. In a sorting machine, the combination of a traveling conveyor adapted to pick up articles one by one, a rotary centrifugal feed means presenting articles loosely and unrestrainedly disposed thereon to said conveyor to be picked up thereby in a substantially continuous stream moving tangentially of the direction of travel of the conveyor at the point of pick-up and at a speed approximately that of the travel of the conveyor at such point, said feed means having means restraining the radial outward movement of the articles on centrifugal force, and means actuating said feed means to dispose said articles as they approach the pick-up point in contacting relation to one another in the direction of tangential movement.

18. In a machine of the class described, a rotatable horizontally disposed concaved member, means for depositing articles on said member comprising a feed chute, and means for agitating said chute comprising means on one side of said member for illuminating the same at a point at the outside of the point of discharge of said chute, said member having an aperture therein, photosensitive means on the other side of said member exposed to light transmitted from said illuminating means through said aperture in a degree dependent upon the presence or absence of articles to obstruct the aperture, and means controlled by the photosensitive means for agitating said chute.

19. A feeding device comprising a concaved feed member, means for depositing articles to be sorted on said feed member at a point substantially removed from the periphery thereof, the face of said feed member having a gradual outward and upward curvature permitting radial outward movement of the articles thereon under influence of centrifugal force to a predetermined radial point at a predetermined speed of rotation of said member, and a rotary pickup means disposed normal to the feed member at the point of outermost movement of the articles to pick up the articles therefrom.

20. In a feed device for a sorting machine, a rotatable concave horizontally disposed feed member adapted to distribute articles disposed thereon by centrifugal force, an oscillatingly mounted chute for supplying articles to said feed member at a point substantially within the periphery thereof, said feed member having a plurality of apertures therein at the outside of said point of delivery of said chute, and photosensitive controlled means for oscillating said chute operatively associated with said apertures in said feed member.

21. A feeding device comprising a concaved feed member, means for depositing articles to be sorted on said feed member at a point substantially removed from the periphery thereof, and a rotary pick-up means disposed to pick up articles from said feed member at the point of outermost movement of the articles thereon.

22. In a feed device for a sorting machine, a rotatable feed member adapted to distribute articles disposed thereon by centrifugal force, means for supplying articles to said feed member at a point substantially within the periphery thereof, and photosensitive controlled means operatively associated with said feed member and said means for supplying articles thereto whereby the absence of articles in a predetermined zone on said feed member initiates through the said photosensitive means the actuation of said means for supplying articles.

23. A feeding device for a rotary machine of the type described, comprising a rotatable upwardly facing concaved feed member, means for depositing articles to be sorted on the feed member at a point substantially interiorly of the periphery thereof, the face of said feed member having a gradual outward and upward curvature adapted to permit radial outward movement of the articles under the influence of centrifugal force to a predetermined radial point at a predetermined speed of rotation of the feed member, and thereafter substantially preventing outward movement thereof at said speed, and rotary means disposed normal to the feed member at the point of outermost movement of the articles to pick up articles therefrom, said rotary means and feed member being driven at speeds bearing predetermined relation to one another.

24. A feeding device comprising a feed member disposed horizontally and mounted for rotation about its axis, said member having an article receiving surface whose outline curves gradually outwardly and upwardly and is designed to increasingly oppose the radial outward movement thereon under centrifugal action of articles placed on the member interiorly of its periphery whereby the centrifugal force acting on the articles disposed on the feed member at a predetermined speed of rotation and diameter of the member is substantially balanced when the articles reach a predetermined radial distance from the axis of rotation of the member, said feed member being associated with a rotary conveyor member in such manner that the plane on the rotary conveyor member at which the articles lie is tangent to a circle whose center is at the axis of rotation of the feed member and whose radius equals the radial distance to which the articles are moved by centrifugal action before said movement is neutralized.

25. A feeding device comprising a feed member disposed horizontally and mounted for rotation about its axis, said member having an article receiving surface whose outline is designed to increasingly oppose the radial outward movement thereon under centrifugal action of articles placed on the member interiorly of its periphery whereby centrifugal force acting on the articles disposed on the feed member at a predetermined speed of rotation and diameter of the member is substantially balanced when the articles reach a predetermined radial distance from the axis of rotation of the member, said feed member being associated with a rotary conveyor member in such manner that the plane on the rotary conveyor member at which the articles lie is tangent to a circle whose center is at the axis of rotation of the feed member and whose radius equals the radial distance to which the articles are moved by centrifugal action before said movement is neutralized.

26. A feeding device for a photoelectric sorting machine having a rotary article pickup and conveyor member adapted to transport articles in a single-file path, comprising a feed member disposed horizontally and mounted for rotation about its axis, said feed member having an article receiving surface whose outline curves gradually outwardly and upwardly and being adapted to have articles to be sorted deposited on said surface from above, the curvature of said surface being related to the intended speed of rotation thereof in such manner that the centrifugal force acting on articles deposited on the feed member and tending to move the same radially outwardly is greatly counteracted and substantially balanced at a predetermined radial distance from their axis of rotation, said feed member being associated with said rotary conveyor member in such manner that the path of the articles on the rotary conveyor member is tangent to a circle whose center is at the axis of rotation of the feed member and whose radius equals the radial distance to which the articles are moved by centrifugal action.

27. A feeding device having a feed member disposed horizontally and mounted for rotation about its axis, said feed member having an article receiving surface whose outline curves gradually outwardly and upwardly, and being adapted to have articles to be sorted deposited on said surface, and means for rotating said feed member at such predetermined speed, governed by the curvature of said surface, that a predetermined centrifugal force acts on articles deposited on the feed member to move the same radially outwardly to a predetermined radial position outwardly of the axis of the feed member.

28. A feeding device having a feed member disposed horizontally and mounted for rotation about its axis, said feed member having an article receiving surface whose outline curves gradually outwardly and upwardly, and being adapted to have articles to be sorted deposited in said surface, the curvature of said surface being related to the intended speed of rotation thereof in such predetermined manner that a predetermined centrifugal force acts on articles deposited on the feed member to move the same radially outwardly, means for rotating said feed member, and means for distributing the uniformity of rotation of the member.

29. In a sorting machine, a rotatable horizontally disposed feed member of generally parabolic section, means for supplying articles to be sorted to said feed member at a point remote from the periphery thereof, means for driving said feed member at a speed bearing such predetermined relation to its sectional outline that the articles being sorted are distributed thereon in a single substantially continuous layer at the periphery thereof, and movable means positioned adjacent said periphery and operative to pick up articles from said layer.

30. In a sorting machine, the combination of a rotary conveyor provided with a series of spaced suction orifices, light sensitive means operatively associated with said conveyor and operative to classify articles conveyed thereby, and a feed means operatively associated with said conveyor to present articles to the point of pick-up of the conveyor in a substantially continuous layer traveling tangentially of said point of pick-up of the suction orifices of the conveyor and with the articles of said layer contacting one another in the direction of tangential travel adjacent said pick-up point.

31. In a sorting machine, the combination of a traveling conveyor having spaced suction orifices adapted to pick up articles one by one, a rotary feed means presenting articles to said conveyor to be picked up thereby in a continuous stream moving in the direction of travel of the conveyor at the point of pick-up with the articles in the stream in contacting relation one to another in the direction of rotary movement of the feed means and the spacing of said suction orifices of said conveyor exceeding the longest dimension of the articles to be sorted, said feed means presenting the articles in an unconfined relation to the conveyor at the point of pick-up in the direction of their travel except as they are confined by the contacting of adjacent articles.

32. In a sorting machine, the combination of a rotary conveyor provided with a series of spaced suction orifices positioned to successively pass a pick-up point as the conveyor is revolved, light sensitive sorting means operatively associated with said conveyor, a feed means operatively associated with said conveyor to present articles thereto in a substantially continuous layer traveling tangentially of the point of pick-up of the conveyor with the articles contacting one another in the direction of tangential travel adjacent said pick-up point and unconfined in the direction of their travel except their contacting relation with one another, and means for supplying articles to said feed means controlled by the latter to maintain such layer in the pick-up zone.

DAVID C. COX.